United States Patent
Fuhr et al.

(10) Patent No.: US 8,426,059 B2
(45) Date of Patent: Apr. 23, 2013

(54) ELECTROCHEMICAL CELL HAVING AN ELECTRICALLY INSULATED HOUSING

(75) Inventors: Jason Fuhr, Sussex, WI (US); Gary Houchin-Miller, Fox Point, WI (US); Thomas J. Dougherty, Waukesha, WI (US)

(73) Assignee: Johnson Controls—Saft Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 13/080,532

(22) Filed: Apr. 5, 2011

(65) Prior Publication Data

US 2011/0244286 A1 Oct. 6, 2011

Related U.S. Application Data

(63) Continuation of application No. PCT/US2009/059707, filed on Oct. 6, 2009.

(60) Provisional application No. 61/103,346, filed on Oct. 7, 2008.

(51) Int. Cl.
*H01M 2/02* (2006.01)
*H01M 4/00* (2006.01)

(52) U.S. Cl.
USPC .............................................. 429/176; 429/94

(58) Field of Classification Search .................. 429/234, 429/206, 245, 210, 160, 161, 159, 120, 176, 429/94
See application file for complete search history.

(56) References Cited

U.S. PATENT DOCUMENTS

| | | | | |
|---|---|---|---|---|
| 3,537,907 | A * | 11/1970 | Wilson | 429/120 |
| 6,387,564 | B1 * | 5/2002 | Yamashita et al. | 429/132 |
| 2003/0228515 | A1 | 12/2003 | Woehrle et al. | |
| 2005/0227148 | A1 | 10/2005 | Nanno et al. | |
| 2006/0166085 | A1 | 7/2006 | Hennige et al. | |
| 2007/0207379 | A1 * | 9/2007 | Hatta et al. | 429/176 |
| 2007/0287063 | A1 * | 12/2007 | Hiratsuka et al. | 429/177 |

FOREIGN PATENT DOCUMENTS

| | | | |
|---|---|---|---|
| JP | 10247479 A * | 9/1998 | |
| JP | 2000/173558 A * | 6/2000 | |
| KR | 1020030066961 A1 * | 8/2003 | |
| KR | 1020060087182 A1 * | 8/2006 | |
| KR | 10782162 | 12/2007 | |
| SU | 371640 A * | 2/1971 | |
| WO | WO-2006/009326 A1 * | 1/2006 | |

OTHER PUBLICATIONS

Machine Translation of KR-1020030066961 A1, Lee, Aug. 14, 2003.*
Machine Translation of KR-1020060087182 A1, Jeon, Aug. 2, 2006.*
Machine Translation of: JP 2000/173558A, Tatsuki et al., Jun. 23, 2000.*
International Search Report and Written Opinion for PCT/US2009/059707, mail date Apr. 1, 2010, 11 pages.

* cited by examiner

*Primary Examiner* — Basia Ridley
*Assistant Examiner* — Kenneth Douyette
(74) *Attorney, Agent, or Firm* — Foley & Lardner LLP

(57) ABSTRACT

An electrochemical cell including a housing configured to receive a cell element. The housing has an electrically-insulating material including metal oxide particles provided on at least a portion of an inner surface thereof to prevent electrical contact between the housing and the cell element. A method of manufacturing an electrochemical cell including applying an electrically-insulating material including metal oxide particles to an inner surface of a housing for an electrochemical cell and inserting a cell element into the housing.

26 Claims, 6 Drawing Sheets

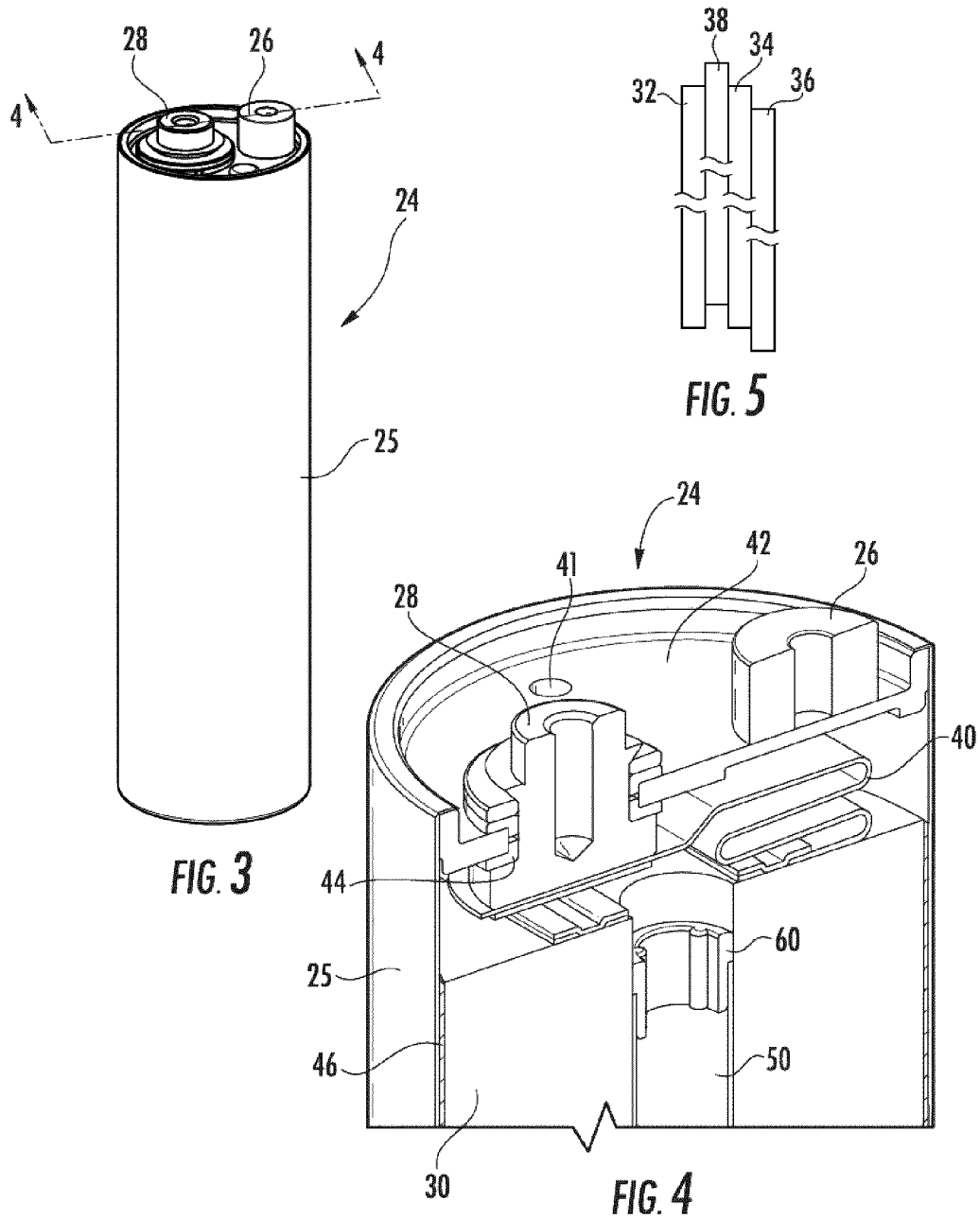

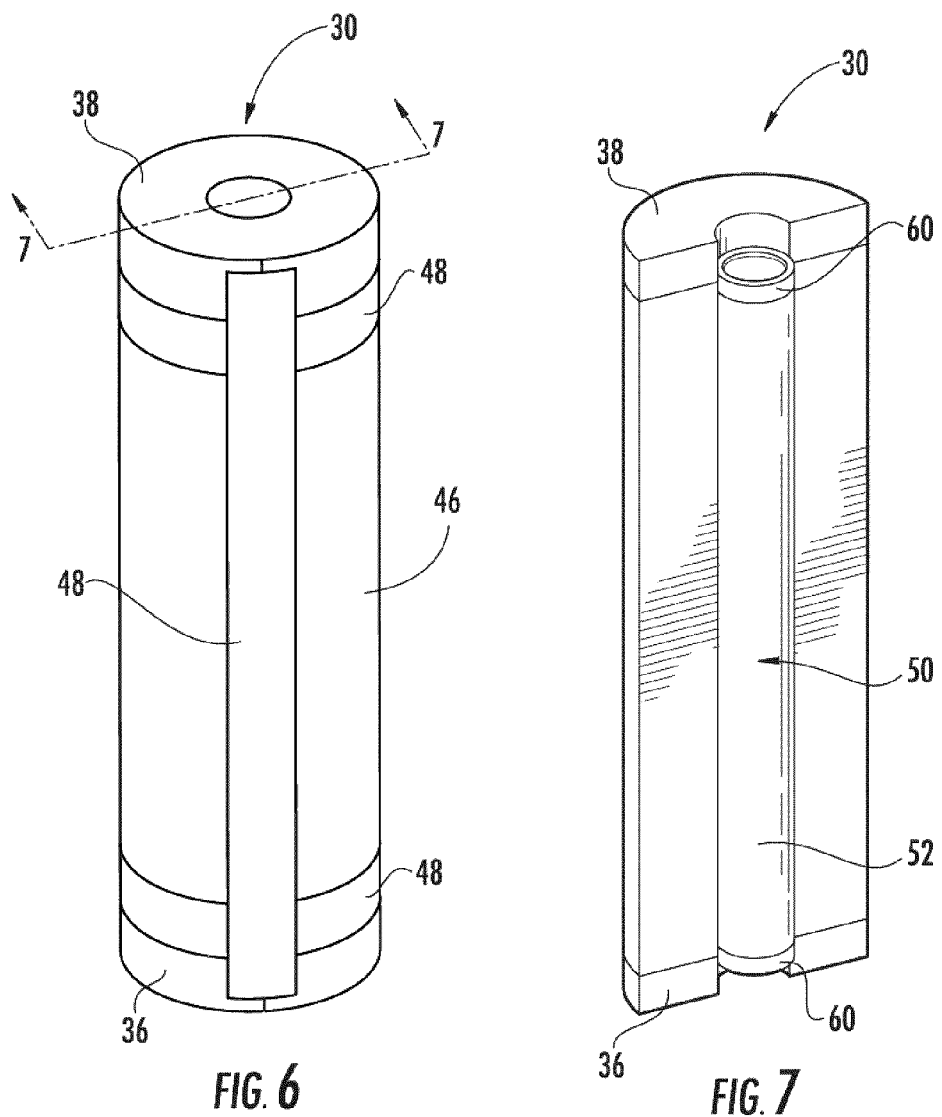

ELECTROCHEMICAL CELL HAVING AN ELECTRICALLY INSULATED HOUSING

CROSS-REFERENCE TO RELATED PATENT APPLICATIONS

This application is a continuation of International Patent Application No. PCT/US2009/059707 filed Oct. 6, 2009, which claims the benefit of and priority to U.S. Provisional Patent Application No. 61/103,346, filed Oct. 7, 2008. The entire disclosures of International Patent Application No. PCT/US2009/059707 and U.S. Provisional Patent Application No. 61/103,346 are incorporated herein by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

An exemplary embodiment relates to an electrochemical cell including a housing configured to receive a cell element. The housing has an electrically-insulating material including metal oxide particles provided on at least a portion of an inner surface thereof to prevent electrical contact between the housing and the cell element.

Another exemplary embodiment relates to a method of manufacturing an electrochemical cell. The method includes applying an electrically-insulating material including metal oxide particles to an inner surface of a housing for an electrochemical cell. The method also includes inserting a cell element into the housing.

BRIEF DESCRIPTION OF THE DRAWINGS

FIG. 3 is a perspective view of an electrochemical cell according to an exemplary embodiment.

FIG. 4 is a partial cross-sectional view of the electrochemical cell shown in FIG. 3 taken along line 4-4 in FIG. 3.

FIG. 5 is a partial cross-sectional view of electrodes and separators of an electrochemical cell according to an exemplary embodiment.

FIG. 6 is an isometric view of a cell element having a jelly roll configuration according to an exemplary embodiment.

FIG. 7 is a cross-sectional view of the cell element shown in FIG. 6 taken along line 7-7 in FIG. 6.

DETAILED DESCRIPTION

Figure 1:
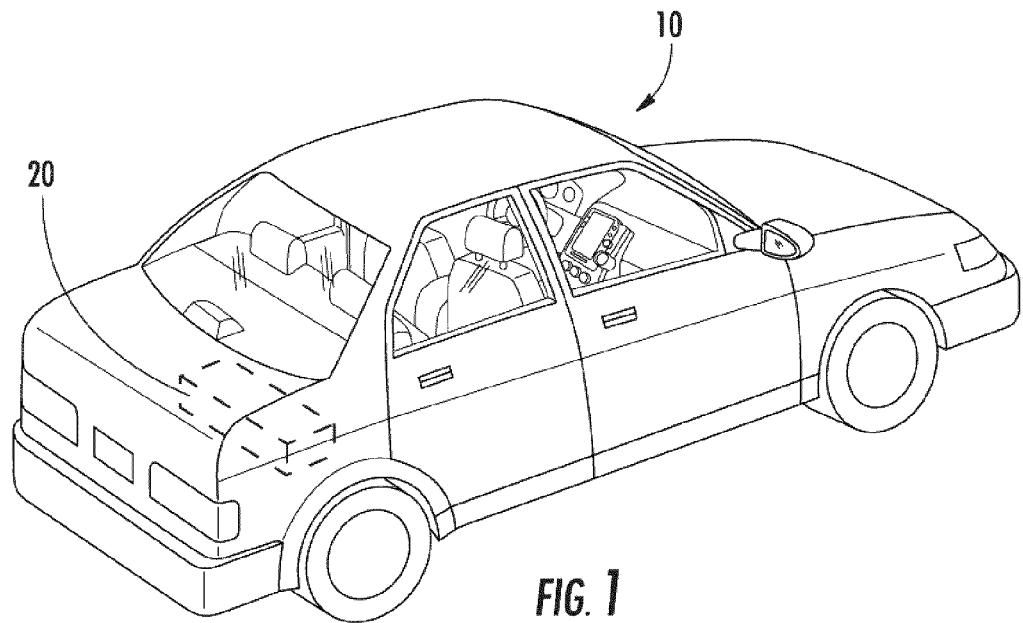
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
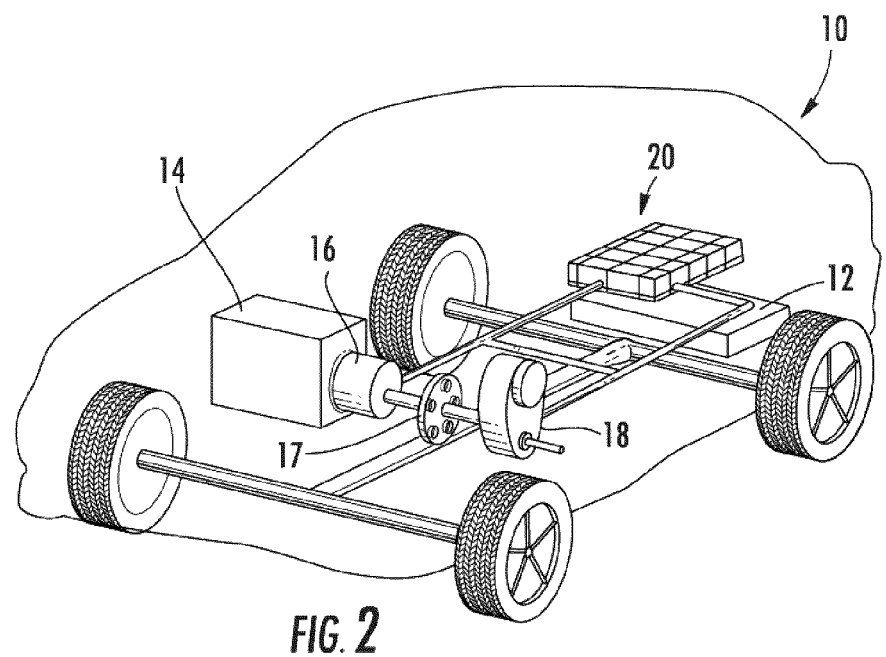
FIG. 2 is a cutaway schematic view of a vehicle including a battery module according to an exemplary embodiment.

FIG. 2 illustrates a cutaway schematic view of a vehicle 10 provided in the form of an HEV according to an exemplary embodiment. A battery system 20 is provided toward the rear of the vehicle 10 proximate a fuel tank 12 (the battery system 20 may be provided immediately adjacent the fuel tank 12 or may be provided in a separate compartment in the rear of the vehicle 10 (e.g., a trunk) or may be provided elsewhere in the vehicle 10). An internal combustion engine 14 is provided for times when the vehicle 10 utilizes gasoline power to propel the vehicle 10. An electric motor 16, a power split device 17, and a generator 18 are also provided as part of the vehicle drive system.

Such a vehicle 10 may be powered or driven by just the battery system 20, by just the engine 14, or by both the battery system 20 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 20, the type of vehicle 10, the type of vehicle technology (e.g., EV, HEV, PHEV, etc.), and the battery chemistry, among other features, may differ from those shown or described.

According to an exemplary embodiment, the battery system 20 includes electrochemical batteries or cells 24, and includes features or components for connecting the electrochemical cells 24 to each other and/or to other components of the vehicle electrical system, and also for regulating the electrochemical cells 24 and other features of the battery system 20. For example, the battery system 20 may include features that are responsible for monitoring and controlling the electrical performance of the battery system 20, managing the thermal behavior of the battery system 20, containment and/or routing of effluent (e.g., gases that may be vented from a cell 24 through a vent), and other aspects of the battery system 20.

Referring now to FIG. 3, an isometric view of an electrochemical cell is shown according to an exemplary embodiment. The battery system 20 includes a plurality of such electrochemical batteries or cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the cells 24 could have other physical configurations (e.g., oval, prismatic, polygonal, etc.). The capacity, size, design, terminal configuration, and other features of the cells 24 may also differ from those shown according to other exemplary embodiments.

FIG. 4 is a partial cross-sectional view of a cell 24 such as that shown in FIG. 3 taken along line 4-4 in FIG. 3. According to an exemplary embodiment, the cell 24 includes a container or housing 25, a cap or cover 42, a bottom portion (not shown), and a cell element 30. According to an exemplary embodiment, the housing 25 may be constructed from a conductive material such as a metal (e.g., aluminum or aluminum alloy, copper or copper alloy, etc.). According to an exemplary embodiment, the cell element 30 is a wound cell element. According to another exemplary embodiment, the cell element 30 may be a prismatic or oval cell element.

According to an exemplary embodiment, the cell element 30 includes at least one cathode or positive electrode 36, at least one anode or negative electrode 38, and one or more separators 32, 34. The separators 32, 34 are provided intermediate or between the positive and negative electrodes 36, 38 to electrically isolate the electrodes 36, 38 from each other. According to an exemplary embodiment, the cell 24 includes an electrolyte (not shown). According to an exemplary embodiment, the electrolyte is provided in the housing 25 of the cell 24 through a fill hole 41.

Figure 8:
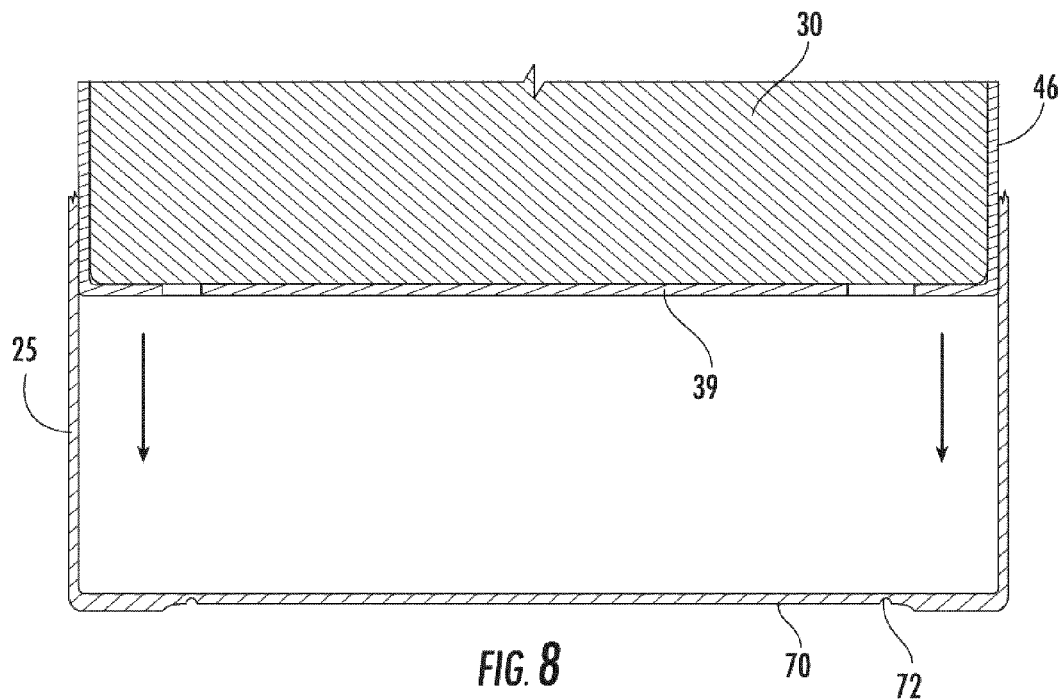
FIG. 8 is a partial cross-sectional view of a cell element having an electrically-insulating material provided thereon being inserted into a housing according to an exemplary embodiment.
Figure 9:
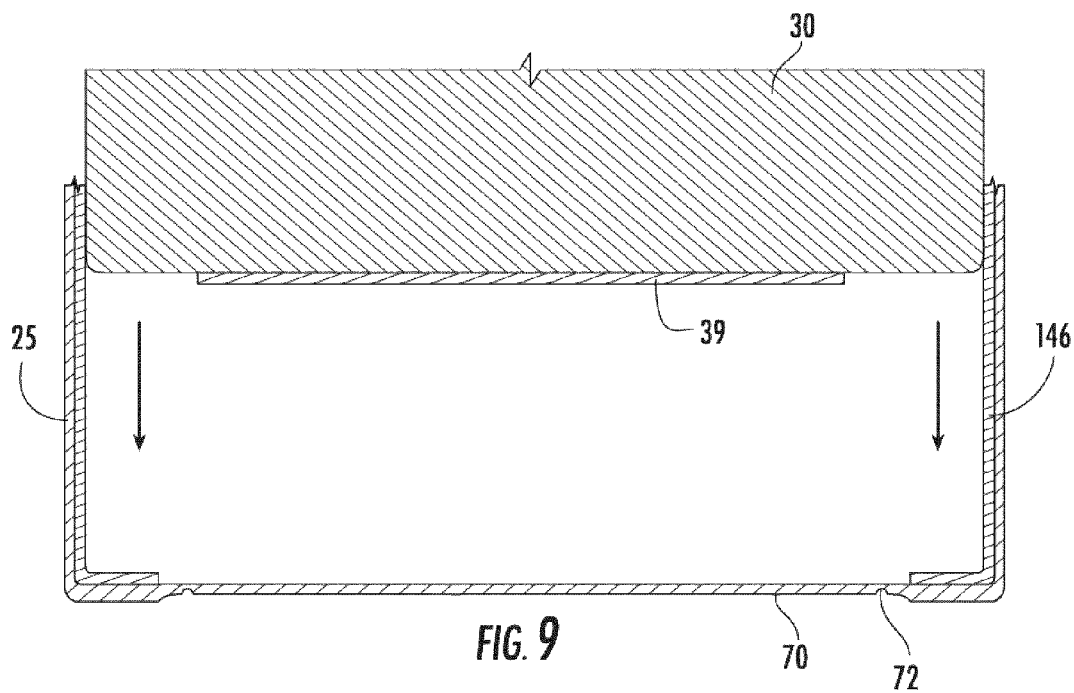
FIG. 9 is a partial cross-sectional view of a cell element being inserted into a housing having an electrically-insulating material provided on an inner surface thereof according to an exemplary embodiment.

The cell 24 also includes a negative current collector 40 and a positive current collector 39 (e.g., as shown in FIGS. 8-9). The negative current collector 40 and the positive current collector 39 are conductive members that are used to couple the electrodes 36, 38 of the cell element 30 to the terminals 26, 28 of the cell 24. For example, the negative current collector 40 couples the negative electrode 38 to the negative terminal 28 and the positive current collector 39 couples the positive electrode 36 to the positive terminal 26 of the cell 24 (e.g., via the housing 25). According to an exemplary embodiment, the current collectors are coupled to the electrodes with a welding operation (e.g., a laser welding operation).

According to an exemplary embodiment, the cell element 30 has a wound configuration in which the electrodes 36, 38 and separators 32, 34 are wound around a member or element provided in the form of a tube or mandrel 50. Such a configuration may be referred to alternatively as a jelly roll configuration. Although the mandrel 50 is shown as being provided as having a generally cylindrical shape, according to other exemplary embodiments, the mandrel 50 may have a different configuration (e.g., it may have an oval or rectangular cross-section shape, etc.). It is noted that the cell element 30, although shown as having a generally cylindrical shape, may also have a different configuration (e.g., it may have an oval, prismatic, rectangular, or other desired cross-sectional shape).

According to another exemplary embodiment, the electrochemical cell 24 may be a prismatic cell having prismatic or stacked cell elements (not shown). In such an embodiment, the positive and negative electrodes 36, 38 are provided as plates that are stacked upon one another in an alternating fashion, with the separators 32, 34 provided intermediate or between the positive and negative electrodes 36, 38 to electrically isolate the electrodes 36, 38 from each other.

According to an exemplary embodiment, the positive electrode 36 is offset from the negative electrode 38 in the axial direction as shown in the partial cross-sectional view shown in FIG. 5. Accordingly, at a first end of the cell element 30, the wound positive electrode 36 will extend further than the negative electrode 38, and at a second (opposite) end of the cell element 30, the negative electrode 38 will extend further than the positive electrode 36.

One advantageous feature of such a configuration is that current collectors may be connected to a specific electrode at one end of the cell 24 without contacting the opposite polarity electrode. For example, according to an exemplary embodiment, a negative current collector 40 (e.g., as shown in FIG. 4) may be connected to the exposed negative electrode 38 at one end of the cell element 30 and a positive current collector (e.g., as shown in FIGS. 8-9) may be connected to the exposed positive electrode 36 at the opposite end of the cell element 30.

According to an exemplary embodiment, the negative current collector 40 electrically connects the negative electrode 38 to the negative terminal 28 of the cell 24. The negative terminal 28 is insulated from the cover 42 of the housing 25 by an insulator 44, as shown in FIG. 4. According to an exemplary embodiment, the positive current collector 39 (e.g., as shown in FIGS. 8-9) electrically connects the positive electrode 36 to a bottom of the housing 25. The housing 25 is electrically connected to the cover 42 (e.g., as shown in FIG. 4), which in turn is electrically connected to the positive terminal 26.

FIGS. 6-7 illustrate an exemplary embodiment of a wound cell element 30 (e.g., a jelly roll) in which electrodes 36, 38 and separators 32, 34 (not shown) are wound around a member or element provided in the form of a mandrel 50 (e.g., a body, center member, shaft, rod, tube etc.). According to an exemplary embodiment, an adhesive or tape 48 (e.g., as shown in FIG. 6) may be used to position an electrically-insulating wrap or film 46 (e.g., as shown in FIGS. 4 and 6) around the cell element 30 in order to at least partially electrically insulate the cell element 30 from the housing 25. According to an exemplary embodiment, the film 46 is a polyimide material such as is commercially available under the trade name Kapton® from E. I. du Pont de Nemours and Company.

According to an exemplary embodiment, the mandrel 50 is provided in the form of an elongated hollow tube 52 and is configured to allow gases from inside the electrochemical cell to flow from one end of the electrochemical cell (e.g., the top) to the other end of the electrochemical cell (e.g., the bottom). According to another exemplary embodiment, the mandrel 50 may be provided as a solid tube.

The mandrel 50 is illustrated, for example, in FIG. 7 as being provided within the center of the cell element 30. According to an exemplary embodiment, the mandrel 50 does not extend all the way to the very top and bottom of the cell element 30. According to other exemplary embodiments, the mandrel 50 may extend all the way to the top and/or bottom of the cell element 30.

Still referring to FIGS. 6-7, according to an exemplary embodiment, the mandrel 50 includes at least one (i.e., one or more) element or drive member 60 joined to an end of the hollow tube 52. According to an exemplary embodiment, the drive members 60 are configured to electrically insulate the hollow tube 52 from the electrodes 36, 38. According to another exemplary embodiment, the hollow tube 52 may be provided in electrical contact with one of the electrodes while being electrically insulated from the other electrode. For example, according to an exemplary embodiment, the hollow tube 52 may be electrically coupled to the positive electrode 36 (or negative electrode 38), while the hollow tube 52 is electrically isolated from the negative electrode 38 (or positive electrode 36) by the drive member 60.

According to an exemplary embodiment, the drive members 60 are formed from an electrically-insulating material such as a polymeric material or other suitable material (e.g., a plastic resin) and the hollow tube 52 is formed from an electrically (and thermally) conductive material such as a metallic material or other suitable material (e.g., aluminum or aluminum alloy). According to another exemplary embodiment, the drive members 60 are formed from an electrically (and thermally) conductive material such as a metallic material or other suitable material (e.g., aluminum or aluminum alloy) and the hollow tube 52 is formed from an electrically-insulating material such as a polymeric material or other suitable material (e.g., a plastic resin). According to another exemplary embodiment, both the drive members 60 and the hollow tube 52 are formed from an electrically-insulating material such as a polymeric material or other suitable material (e.g., a plastic resin).

One advantageous feature of the mandrels 50 as described above is that the drive members 60 coupled to the hollow tube 52 keep the positive and negative electrodes 36, 38 electrically separated from each other. Additionally, when the hollow tube 52 of the mandrel 50 is formed from a relatively low cost material (e.g., a drawn aluminum tube or extruded aluminum tube), the mandrel 50 may have a lower cost as compared to other mandrels in which the entire assembly is made of a polymeric material.

According to other exemplary embodiments, other configurations of the cell element 30 may be used that do not include the mandrel 50 or the drive members 60 (e.g., a prismatic cell element). Additionally, while the cell 24 in FIGS. 4 and 6 is shown according to an exemplary embodiment as having the exposed negative electrode 38 proximate to the top of the cell 24 and the exposed positive electrode 36 proximate to the bottom of the cell 24, according to other exemplary embodiments, the orientation of the cell element 30 (and thus the positions of the current collectors) may be reversed. Additionally, according to other exemplary embodiments, the terminals 26, 28 of the cell 24 may be provided on opposite ends of the cell 24 (e.g., a negative terminal 28 may be provided on the top of the cell 24 and a positive terminal 26 may be provided on the bottom of the cell 24).

Referring now to FIGS. 8-9, a cell element 30 is shown being inserted into a housing 25 according to an exemplary embodiment. According to an exemplary embodiment, the cell element 30 includes a positive current collector 39 coupled to an end of the cell element 30 such that it is coupled to at least one positive electrode 36 of the cell element 30. The positive current collector 39 is configured to be coupled to a bottom portion of the housing 25 (e.g., by a welding operation, such as laser welding).

According to an exemplary embodiment, the bottom portion of the housing 25 includes a vent 70 that is configured to separate from the housing 25 to release high pressure gases and/or effluent from the electrochemical cell 24 if necessary. A groove 72 is provided at an outer edge or circumference of the vent 70 and is configured to fracture to aid the vent 70 from separating from the housing 25.

As shown in FIG. 8, an electrically-insulating wrap or film 46 is provided around the cell element 30. The film 46 is configured to at least partially electrically insulate the cell element 30 from the housing 25. As shown in FIG. 8, the film 46 may cover both a portion of the vertical side of the cell element 30 and a portion of the horizontal side (i.e., bottom) of the cell element 30. According to other various exemplary embodiments, the film 46 may cover only a portion of the vertical side of the cell element 30 or a portion of the horizontal side (i.e., bottom) of the cell element 30. According to an exemplary embodiment, the film 46 may be a polymeric material (e.g., such as polyethylene or polypropylene).

According to an exemplary embodiment, the film 46 is provided around the cell element 30 after the cell element 30 has been formed (e.g., after the cell element 30 has been wound or stacked). According to another exemplary embodiment, in the case of a wound cell element 30, the film 46 may be formed by wrapping the separators 32, 34 around the cell element 30 an additional time immediately after the completion of forming the cell element 30 (e.g., the separators 32, 34 are wrapped an additional revolution around the cell element 30).

According to another exemplary embodiment shown in FIG. 9, an electrically-insulating coating 146 (e.g., material, layer, film, etc.) is provided on an inner surface of the housing 25 to at least partially electrically insulate the cell element 30 from the housing 25. According to an exemplary embodiment, the coating 146 may cover all or a substantial portion of the interior sides of the housing 25 and all or a portion of the bottom portion of the housing 25. According to other exemplary embodiments, the coating 146 may cover all or a substantial portion of the internal sides of the housing 25 or all or a portion of the bottom portion of the housing 25. The coating 146 may supplement or may be used in place of an insulating wrap or film (such as film 46).

According to an exemplary embodiment, the coating 146 is provided, applied, sprayed, or coated onto the inner surface of the housing. According to various exemplary embodiments, any suitable method of applying coating 146 to the inner surface of the housing 25 may be used. For example, the coating 146 may be applied to the inner surface of the housing 25 by thermal spraying (e.g., plasma arc), dry painting (e.g., powder coating), wet painting, or an enamel painting process.

According to an exemplary embodiment, the coating 146 is applied onto the inner surface of the housing 25 using a spraying process. According to an exemplary embodiment, the coating 146 has a thickness in the range of about 50 microns to 1,000 microns. According to other exemplary embodiments, the thickness of the coating 146 may be smaller or greater depending on the application, the desired amount of electrical insulation, etc.

The coating material may be a material with suitable electrical insulating properties. In various exemplary embodiments, the electrically-insulating coating material comprises a metal oxide such as tin oxide, aluminum oxide, titanium oxide, zinc oxide, and/or zirconium oxide. One advantageous feature of using a metal oxide as the coating material is that the metal oxide, while being electrically insulative, also has relatively high thermal conductivity. In some embodiments, the coating material may also include a binder, such as polypropylene or polyethylene. According to other exemplary embodiments, the coating material may be any suitable non-conductive material (e.g., ceramic, plastic, polymer, etc.).

According to an exemplary embodiment, the coating material comprises metal oxide particles. According to one exemplary embodiment, the metal oxide particles have an average diameter in the range of about 10 microns to 50 microns. According to other exemplary embodiments, the average diameter of the metal oxide particles may be smaller or greater depending on the desired application, amount of electrical insulation, coating thickness, etc.

According to an exemplary embodiment, the metal oxide particles are coated with a binder material (e.g., polypropylene or polyethylene). In various embodiments, the coating material and the housing 25 are charged to opposite polarities to aid in adhering the coating material to the housing 25. According to an exemplary embodiment, the coating material is applied to the housing 25 in a powdered (dry) form. According to another exemplary embodiment, the coating material is applied to the housing in a liquid (wet) form (e.g., the metal oxide particles are suspended in a liquid binder or carrier material to form a paint-like substance).

In various exemplary embodiments, the coating material is heated to at least 100 degrees Celsius to remove any water from the coating material. According to other various exemplary embodiments, the coating material and housing 25 are both preheated to between about 100 to 200 degrees Celsius. According to an exemplary embodiment, the binder material melts into place when the coating material is provided onto the inner surface of the housing 25, thus locking the metal oxide particles (or other electrically-insulating material) into place.

In various exemplary embodiments, the coating material is mostly cured within about 2 to 20 seconds after the coating process. For example, if the coating material and the housing 25 are both heated to a temperature of between about 100 to 200 degrees Celsius prior to coating, the coating material will be about 80% cured within 20 seconds after the coating process, which is sufficient to prevent the coating material from spreading undesirably. Additionally, the curing process may continue until completed as the housing 25 is allowed to cool.

According to an exemplary embodiment, an electrochemical cell 24 may include both a wrap (e.g., wrap 46 as shown in FIG. 8) provided around a cell element 30 and a coating (e.g., coating 146 as shown in FIG. 9) provided on an inner surface of a housing 25. For example, a cell element 30 having an insulative film 46 provided around an outer circumference of the cell element 30 may be inserted into a housing 25 that has a coating 146 provided on all or a portion of the bottom portion of the housing 25. In this embodiment, the film 46 would provide electrical insulation between the outer circumference of the cell element 30 and the interior sides of the housing 25, and the coating 146 would provide electrical insulation between the bottom of the cell element 30 and the bottom portion of the housing 25.

Figure 10:
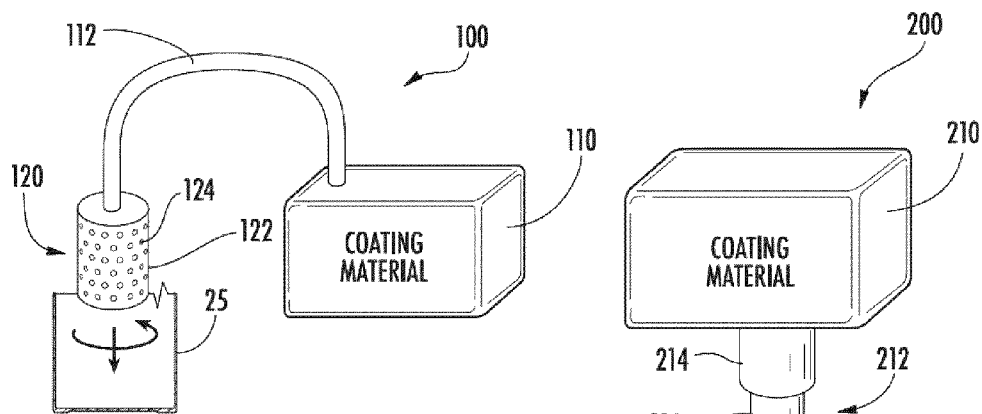
FIG. 10 is a schematic diagram of a coating system having an applicator used to apply electrically-insulating material to an inner surface of a housing according to an exemplary embodiment.

FIG. 10 illustrates one exemplary embodiment of a system 100 used to form the coating 146. The system 100 includes a container 110 that contains the coating material to form the coating 146, a transfer tube or hose 112, and an applicator 120. According to various exemplary embodiments, the applicator 120 may be any size and shape depending upon the type of housing 25 to be coated, the type of coating, the desired thickness of the coating, etc. According to various exemplary embodiments, the coating material is applied to the housing 25 in a powdered (dry) form or in a liquid (wet) form.

According to an exemplary embodiment, the applicator 120 includes a generally cylindrical body 122 that includes a plurality of holes or apertures 124 provided on an outer circumference of the body 122. The coating material is provided, introduced, or otherwise fed into the applicator 120 from the container 110. For example, a pump (not shown) may be provided along with the container 110 to provide pressurized coating material to the applicator 120. According to another exemplary embodiment, the coating material may otherwise be pressurized (e.g., by air). According to another exemplary embodiment, the coating material may be gravity fed to the applicator 120.

According to an exemplary embodiment, the applicator 120 is placed inside the housing 25. The coating material is then sprayed onto an inner surface of the housing 25. According to an exemplary embodiment, the applicator 120 is rotated such that the coating material is forced through the apertures 124 (e.g., individually, or by a combination of a pump, air pressure, centrifugal force, etc.) and is dispensed onto the inner surface of the housing 25. According to another exemplary embodiment, the housing 25 may be rotated with respect to the applicator 120. According to another exemplary embodiment, both the applicator 120 and the housing 25 may be rotated with respect to one another.

According to an exemplary embodiment, the applicator 120 is moved such that it is inserted (e.g., horizontally, vertically, etc.) into the housing 25 to coat the inner surface of the housing 25. According to another exemplary embodiment, the housing 25 is moved with respect to the applicator 120. According to another exemplary embodiment, both the applicator 120 and the housing 25 are moved relative to each other.

According to a particular exemplary embodiment, no spray apertures 124 are provided at or near the bottom of the applicator 120 to avoid coating all or a portion of the bottom portion of the housing 25 because in many cell designs, one of the electrodes is conductively connected to the bottom of housing 25 (e.g., by a current collector). According to an exemplary embodiment, spray apertures may be provided only on the bottom of the applicator 120, or both on the side and bottom of the applicator 120.

According to an exemplary embodiment, the spray apertures 124 are evenly spaced about the side of the body 122 of the applicator 120. However, the spacing of the spray apertures 124 may vary according to other exemplary embodiments. The determination of the optimum spacing is a function of several variables, including, but not limited to, aperture size, coating viscosity, desired coating layer thickness, and/or rotational speed. The shape and size of spray apertures 124 may be varied considerably according to factors including, but not limited to, the chosen coating material, desired coating layer thickness, etc.

Figure 14:
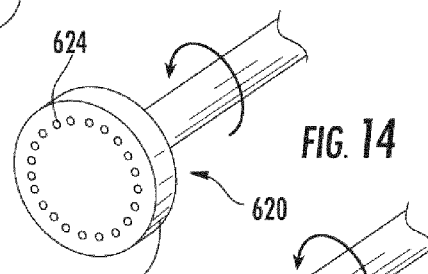
FIG. 14 is a perspective view of an end of an applicator used to apply an electrically-insulating material to a bottom portion of a housing according to an exemplary embodiment.
Figure 15:
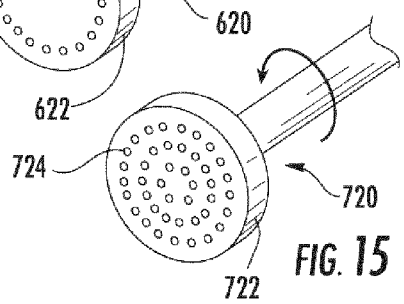
FIG. 15 is a perspective view of an end of an applicator used to apply an electrically-insulating material to a bottom portion of a housing according to another exemplary embodiment.

According to another exemplary embodiment, for example, as shown in FIGS. 14 and 15, an applicator 620, 720 may have holes or apertures 624, 724 located along a bottom side of a body 622, 722 of the applicator 620, 720. As shown in FIG. 14, the apertures 624 are located along the outer edge (i.e., along the external circumference) of the bottom of the body 622 to provide coating material only along a portion of the bottom portion of the housing 25. As shown in FIG. 15, the apertures 724 are generally evenly spaced across the entire bottom side of the body 722. However, according to other exemplary embodiments, the apertures 624, 724 may be otherwise arranged and/or configured.

Figure 11:
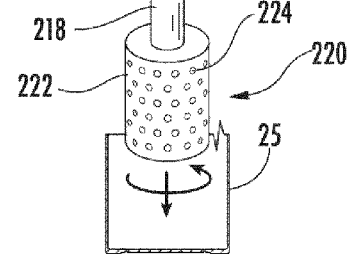
FIG. 11 is a schematic diagram of a coating system having an applicator used to apply electrically-insulating material to an inner surface of a housing according to another exemplary embodiment.
Figure 12:
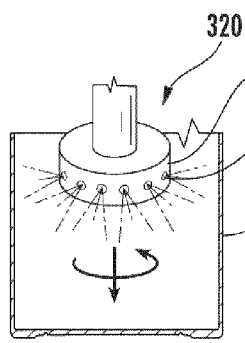
FIG. 12 is a partial schematic diagram of an applicator used to apply an electrically-insulating material to an inner surface of a housing according to an exemplary embodiment.

According to another exemplary embodiment, the applicators 620, 720 may include apertures 624, 724 on the bottom of the body 622, 722 of the applicators 620, 720 (e.g., as shown in FIGS. 14-15) and also apertures (not shown) along a side of the body 622, 722 of the applicator 620, 720 (similar to apertures 124, 224, 324 as shown in FIGS. 10-12) so that coating material can be provided simultaneously to both the interior sides of the housing 25 and the bottom portion of the housing 25.

Referring to FIG. 10, according to various exemplary embodiments, application of the coating material is accomplished by providing the coating material into the body 122 of the applicator 120. Centrifugal forces created by spinning the applicator 120 help to distribute or spray the coating material onto the inner surface of the housing 25. In some embodiments, the coating material is pressurized. This helps provide a constant supply of the coating material to all spray apertures 124 of the applicator 120, and may contribute to spraying the coating material onto the inner surface of the housing 25.

In various exemplary embodiments, the coating material is introduced into the applicator 120 before it starts to spin. In other embodiments, the applicator 120 is spinning before the coating material is introduced. In some embodiments, the applicator 120 is brought to full rotational speed before the coating material is provided to the applicator 120. In most embodiments, the flow of coating material is stopped before the applicator 120 stops spinning in order to minimize coating material dripping from the applicator 120 to the bottom of the housing 25.

Referring now to FIG. 11, a system 200 is shown according to an exemplary embodiment. The system 200 includes a container 210 which contains coating material that is to be provided on an inner surface of a housing 25. The coating material from the container 210 is transferred to an applicator 220 via a transfer tube 212. According to an exemplary embodiment, the transfer tube 212 includes a first section 214 which is connected to a second section 216, which in turn is connected to a third section 218. According to an exemplary embodiment, the sections 214, 216, 218 are configured to be telescoping sections which allow the applicator 220 to move into and out of the housing 25. According to another exemplary embodiment, the housing 25 may move with respect to the applicator 220, or both the applicator 220 and the housing 25 may move with respect to one another. According to various exemplary embodiments, the coating material may be provided to the applicator 220 under pressure or may be gravity fed.

The applicator 220 is similar to the applicator 120 as shown in FIG. 10. The applicator 220 includes a generally cylindrical body 222 which includes a plurality of holes or apertures 224 provided throughout the outer surface of the main body 222 to disperse the coating material to the inner surfaces of the housing 25. The applicator 220 is also configured to rotate with respect to a longitudinal axis of the housing 25.

Referring now to FIG. 12, an applicator 320 is shown according to another exemplary embodiment. The applicator 320 includes a spray nozzle 322 which includes a plurality of holes or apertures 324 provided along an outer circumference of the nozzle 322. According to various exemplary embodiments, the applicator 320 may have a greater or lesser number of apertures 324 than are shown in FIG. 12 (e.g., the apertures may be spread further apart, closer together, stacked vertically, provided in a zig-zag fashion, etc.). According to other exemplary embodiments, the apertures 324 may have different shapes (e.g., oval, rhomboid, square, etc.) and/or sizes.

According to an exemplary embodiment, the applicator 320 is configured to move into and out of the housing 25 in order to coat the inner surface of the housing 25. According to another exemplary embodiment, the housing 25 may move with respect to the applicator 320, or both the applicator 320 and the housing 25 may move with respect to one another. The applicator 320 is also configured to rotate about a central axis of the applicator 320. According to various exemplary embodiments, the coating material may be provided under pressure to applicator 320 or may be gravity fed to the applicator 320.

Figure 13:
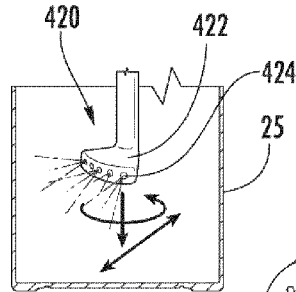
FIG. 13 is a partial schematic diagram of an applicator used to apply an electrically-insulating material to an inner surface of a housing according to another exemplary embodiment.

Referring now to FIG. 13, an applicator 420 is shown according to another exemplary embodiment. The applicator 420 includes a spray nozzle 422 that includes a plurality of holes or apertures 424 that are configured to provide or spray the coating material onto the inner surface of the housing 25. Similar to the applicator 320 as shown in FIG. 12, the applicator 420 is configured to move into and out of the housing 25 and also to rotate about a central axis of the housing 25. According to another exemplary embodiment, in the case of a prismatic housing, the applicator 420 may move longitudinally with respect to the housing 25. According to various other exemplary embodiments, the housing 25 may move with respect to the applicator 420 (e.g., in-out, up-down, side-to-side, etc.), or both the applicator 420 and the housing 25 may move with respect to one another (e.g., in-out, up-down, side-to-side, etc.).

As can be seen in FIG. 13, the applicator 420 is configured to spray the coating material in substantially a single direction out from an end of the nozzle 422. This allows greater control over the application of the coating material to the inner surface of the housing 25 as opposed to the applicator 320 (as shown in FIG. 12), which is configured to spray coating material circumferentially out from the nozzle 322 of the applicator 320.

For example, the applicator 420 may be used in connection with a prismatic housing (not shown). The applicator 420 is first placed within the prismatic housing. Coating material is sprayed (e.g., deposited, provided, applied, etc.) along a first side of the prismatic housing, with the apertures 424 of the nozzle 422 facing the first side of the housing. The applicator 420 would then rotate 90 degrees to spray a second side of the housing, with the apertures 424 of the nozzle 42 now facing the second side of the housing. This process would be repeated until all the sides (and/or all or a portion of the bottom) of the prismatic housing is coated with the coating material.

It should be noted that the shape, size, and configuration of the various applicators (and apertures of the applicators) for the various coating systems may take many possible forms, as one of ordinary skill in the art would readily understand.

According to another exemplary embodiment, the coating material may be provided on the inner surfaces of the housing 25 by thermal spraying (e.g., cold spraying, detonation spraying, flame spraying, high-velocity-oxygen-fuel coating spraying, plasma spraying, warm spraying, wire arc spraying, etc.). When using a thermal spraying process, the electrically-insulating material (e.g., metal oxide, ceramic, plastic, composite, etc.) is provided in a powder or feedstock (i.e., wire) form and then heated or melted to a molten or semi-molten state (e.g., by combustion process, electrical arc discharge, etc.). The electrically-insulating material (now in the form of droplets) is then sprayed (e.g., accelerated, propelled, etc.) onto the inner surfaces of the housing 25. Upon impacting or reaching the inner surfaces of the housing 25, the droplets of the electrically-insulating material flatten, solidify, and form a coating. It should be noted that the exact use and application of the thermal spraying processes may vary, as one of ordinary skill in the art would understand.

According to another exemplary embodiment, the coating material may be provided on the inner surfaces of the housing 25 by a painting process. According to an exemplary embodiment, the electrically-insulating material (e.g., metal oxide, ceramic, plastic, composite, etc.) is mixed with a solvent or carrier material to form a paintable composition of coating material. According to an exemplary embodiment, the paintable composition of coating material has a high content of electrically-insulating material (e.g., a high content of metal oxide particles to solvent or carrier material). According to one exemplary embodiment, the coating material is spray painted onto the housing 25. According to another exemplary embodiment, the coating material is brush painted (e.g., by a hand held brush, by a rotary brush, etc.) onto the housing 25. It should be noted that the exact use and application of the painting processes may vary, as one of ordinary skill in the art would understand.

According to another exemplary embodiment, the coating material may be provided on the inner surfaces of the housing 25 by a powder coating process. According to an exemplary embodiment, the electrically-insulating material (e.g., metal oxide particles, ceramics, polymers, etc.) is provided in a powdered form and then electrostatically applied to the inner surfaces of the housing 25 (e.g., with an electrostatic gun, Corona gun, Tribo gun, fluidized bed, electrostatic magnetic brush, etc.). According to an exemplary embodiment, the electrically-insulating materials may be coated with a binder material (e.g., a polypropylene or polyethylene) prior to being applied to the housing 25. The housing 25, having the powdered coating on it, is then cured (e.g., at a temperature in the range of about 100-200 degrees Celsius) to allow the powder coating to melt (or semi-melt) and flow over the inner surfaces of the housing 25. It should be noted that the exact use and application of the powder coating process may vary, as one of ordinary skill in the art would understand.

Figure 16:
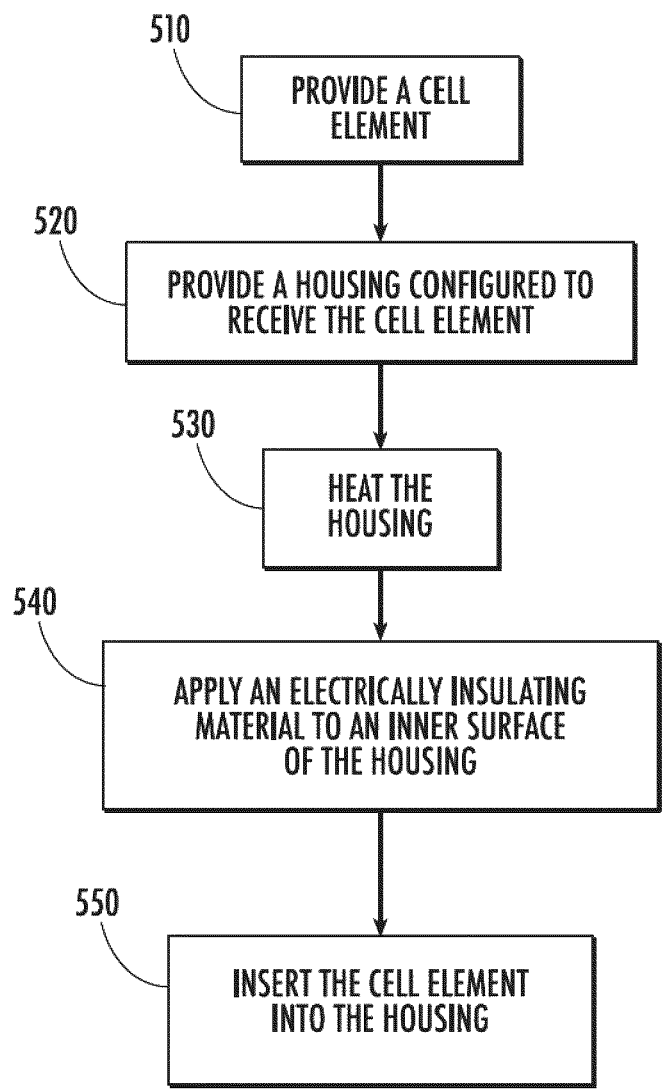
FIG. 16 is a flow diagram for a method of manufacturing an electrochemical cell according to an exemplary embodiment.

Referring now to FIG. 16, an assembly process or method used to manufacture an electrochemical cell is shown according to an exemplary embodiment. In a first step 510, a cell element is provided. In a second step 520, a housing configured to receive the cell element is provided. In a third step 530, the housing of the electrochemical cell is heated (e.g., to a temperature in the range of about 100-200 degrees Celsius). In a fourth step 540, an electrically-insulating material is applied to an inner surface of the housing. In a fifth step, the cell element is inserted into the cell housing.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the electrochemical cell having an electrically-insulated housing as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electrochemical cell comprising:
   a rigid housing configured to receive a cell element, the housing having an electrically-insulating coating material comprising metal oxide particles in a binder comprising at least one material selected from the group consisting of polypropylene and polyethylene;
   wherein the electrically-insulating coating material is provided on at least one portion of an inner surface of the housing to prevent electrical contact between the housing and the cell element.

2. The electrochemical cell of claim 1, wherein the electrically-insulating material has a thickness of between 50 and 1,000 microns.

3. The electrochemical cell of claim 1, wherein the housing comprises a conductive material.

4. The electrochemical cell of claim 3, wherein the conductive material of the housing is aluminum.

5. The electrochemical cell of claim 1, wherein the metal oxide particles are selected from the group consisting of tin oxide, aluminum oxide, titanium oxide, zinc oxide, and zirconium oxide.

6. The electrochemical cell of claim 1, wherein the metal oxide particles have an average diameter in the range of about 10-50 microns.

7. The electrochemical cell of claim 1, wherein the binder holds the metal oxide particles in place.

8. The electrochemical cell of claim 7, wherein the metal oxide particles are coated with the binder.

9. The electrochemical cell of claim 1, wherein the housing includes interior sides and a bottom, wherein the electrically-insulating material is provided only on the interior sides.

10. The electrochemical cell of claim 1, further comprising a cell element within the housing.

11. The electrochemical cell of claim 10, wherein the cell element comprises an electrically-insulating wrap on an outer surface thereof.

12. The electrochemical cell of claim 10, wherein the cell element is a wound cell element.

13. The electrochemical cell of claim 10, wherein the cell element is a prismatic cell element.

14. The electrochemical cell of claim 1, wherein the housing includes interior sides and a bottom, wherein the electrically-insulating material is provided on the bottom.

15. The electrochemical cell of claim 1, wherein the housing includes interior sides and a bottom, wherein the electrically-insulating material is provided on the interior sides.

16. The electrochemical cell of claim 1, wherein the metal oxide particles are mixed in the binder.

17. The electrochemical cell of claim 1, wherein the metal oxide particles are suspended in the binder.

18. An electrochemical cell comprising:
   a cell element; and
   a rigid housing having the cell element received therein, the housing having an electrically-insulating material comprising metal oxide particles in a binder comprising at least one material selected from the group consisting of polypropylene and polyethylene;
   wherein the electrically-insulating coating material is provided on at least one portion of an inner surface of the housing to prevent electrical contact between the housing and the cell element.

19. The electrochemical cell of claim 18, wherein the electrically-insulating material has a thickness in the range of about 50 microns to 1,000 microns.

20. The electrochemical cell of claim 18, wherein the electrically-insulating material includes metal oxide particles having an average diameter in the range of about 10 microns to 50 microns.

21. The electrochemical cell of claim 18, wherein the metal oxide particles are selected from the group consisting of tin oxide, aluminum oxide, titanium oxide, zinc oxide, and zirconium oxide.

22. The electrochemical cell of claim 18, wherein the housing comprises a conductive material.

23. The electrochemical cell of claim 22, wherein the conductive material is aluminum.

24. The electrochemical cell of claim 18, wherein the housing includes interior sides and a bottom, wherein the electrically-insulating material is provided only on the interior sides.

25. The electrochemical cell of claim 18, wherein the metal oxide particles are mixed in the binder.

26. The electrochemical cell of claim 18, wherein the metal oxide particles are suspended in the binder.

* * * * *